United States Patent [19]

Sugawara

[11] Patent Number: 6,011,797
[45] Date of Patent: Jan. 4, 2000

[54] ATM COMMUNICATION DEVICE USING INTERFACE SIGNAL OF HIPPI

[75] Inventor: Tsugio Sugawara, Tokyo, Japan

[73] Assignee: NEC Corporation, Tokyo, Japan

[21] Appl. No.: 08/896,027

[22] Filed: Jul. 17, 1997

[30]     Foreign Application Priority Data

Jul. 17, 1996  [JP]  Japan .................................... 8-205517

[51] Int. Cl.$^7$ ........................... H04L 12/56; G06F 13/42; G06F 13/00
[52] U.S. Cl. ........................... 370/395; 395/855; 395/285
[58] Field of Search .................................... 370/395, 465, 370/466, 474, 389, 392, 542, 543, 535, 537, 538, 351, 396

[56]          References Cited

U.S. PATENT DOCUMENTS

| 5,214,642 | 5/1993 | Kunimoto et al. | 370/82 |
| 5,493,339 | 2/1996 | Birch et al. | 348/461 |
| 5,519,835 | 5/1996 | Nakagaki et al. | 395/200.13 |
| 5,710,942 | 1/1998 | Nakagaki et al. | 395/872 |
| 5,757,798 | 5/1998 | Hamaguchi | 370/397 |
| 5,802,054 | 9/1998 | Bellenger | 370/401 |
| 5,842,040 | 11/1998 | Hughes et al. | 395/831 |

FOREIGN PATENT DOCUMENTS

| 63-284949 | 11/1988 | Japan . |
| 64-47151 | 2/1989 | Japan . |
| 4-220835 | 8/1992 | Japan . |
| 4-257144 | 9/1992 | Japan . |
| 5-22334 | 1/1993 | Japan . |
| 5-191434 | 7/1993 | Japan . |
| 5-292109 | 11/1993 | Japan . |
| 8-139751 | 5/1996 | Japan . |

OTHER PUBLICATIONS

"A Study on the Packet Allocation Method of Multilink System for the Broadband Network"—Vol. 91, No. 456, pp. 67–72, Jan. 31, 1992.
"Performance Evaluation of a Distributed Multi–Link System"—Vol. 92, No. 76, pp. 25–30, May 29, 1992.
"Implementation of HIPPI–ATM Adapter"—Vol. 94, No. 209, pp. 57–62, Sep. 1, 1994.
"A Study on ATM Adaptation layer Function for HIPPI"—Proceedings of the 1994 IEICE Spring Conference, p. 3–282, Mar. 26, 1994.
"A Study on Interworking Technology between HIPPI and ATM"—Vol. 95, No. 329, pp. 73–78, Oct. 20, 1995.

*Primary Examiner*—Ajit Patel
*Assistant Examiner*—Brian Nguyen
*Attorney, Agent, or Firm*—Foley & Lardner

[57]            ABSTRACT

An ATM communication device includes an ATM line termination transmission circuit connected to an ATM network through an ATM line composed of a bundle of a plurality of lines to transmit ATM cells independently for each system, an HIPPI burst transmission circuit to convert HIPPI bursts into H-PDUs, an H-PDU splitting circuit to splitt the H-PDUs into split H-PDUs of a plurality of systems according to the number of lines of the ATM line, and a cell assembling circuit to cellulate the split H-PDUs individually for each system and sending the cells to the ATM line through the ATM line termination transmission circuit.

18 Claims, 6 Drawing Sheets

ATM COMMUNICATION DEVICE USING INTERFACE SIGNAL OF HIPPI

BACKGROUND OF THE INVENTION

1. Field of the Invention

The present invention relates to an ATM communication device using interface signals of an HIPPI (High Performance Parallel Interface) and, more particularly, to an ATM communication device capable of efficiently transferring data packets at a high speed.

2. Description of the Related Art

HIPPI is an electric signal interface for conducting high-speed data transfer to transmit data at 800 Mbps (megabits per second) or 1.6 Gbps (giga bits per second) of information. Interface signals of an HIPPI are mainly used in communication conducted by such systems as super computers and work stations dealing with graphic data which require high-speed data transfer. For efficient execution of such high-speed data transfer, an ATM (Asynchronous Transfer Mode) line needs at least a line of STM-4 (Synchronous Transfer Module-4 (622 Mbps) recommended by ITU-T (International Telecommunication Standardization Sector)) with a capacity of 622 Mbps or a super-high-speed line with a larger capacity. 622 Mbps capacity STM-4 line is, however, too expensive as a subscriber's loop of an ATM network to be widely used.

FIG. 6 is a timing chart showing the state of data transfer by a conventional ATM communication device using an HIPPI interface. In data transfer under the credit control conducted based on the recommendation of ANSI (American National Standards Institute), upon generation of a transmission request, a device on a transmission side transmits a connection request packet 11 to a device on a data reception side through an ATM line. Here, credit control is referred to as one of techniques for controlling transmission by a device on the transmission side so as to prevent an overflow of data from occurring at the device on the reception side. More specifically, credit control is realized by timely notifying a device on a transmission side by a device on a reception side, of a credit value indicative of the number of receivable packets at that time on the reception side device. Packet in this case represents a unit data length as a unit of transmission and reception, which does not always coincide with a packet in protocol (transmission procedure).

When the data reception side device which has received the connection request packet 11 is allowed to receive data, it returns a packet 12 including initial credits to the transmission side device. A credit value notified to a transmission side device by a reception side device at the beginning of a series of communication is referred to as an initial credit value. Ordinarily used as an initial credit value is a value indicative of the number of buffers corresponding to the number of maximum continuous bursts receivable by the reception side device. Burst has a fixed length and in general a plurality of bursts constitutes one packet with a variable length. In a case of an HIPPI, while an HIPPI packet in protocol is made up of a plurality of HIPPI bursts and a transmission destination is set on an HIPPI packet basis, credit control is applied on an HIPPI burst basis. In other words, an object of credit control in the HIPPI is an HIPPI burst.

Upon receiving the packet 12 including the initial credits, the data transmission side device is allowed to continuously transmit as many HIPPI bursts as the number of the initial credits. In FIG. 6, one arrow 13 is illustrated to correspond to one HIPPI burst.

When the data transmission side device starts transmission of an HIPPI packet, the data reception side device, upon receiving as many HIPPI bursts as the number equivalent to a new predetermined credit value, returns a packet 14 including the new credits to the transmission side device. As a result, the reception side device notifies the transmission side device that as many HIPPI bursts as the number equivalent to the new credit value (in a case of FIG. 6, the new credit value is set to be "8") are receivable. Notification by the transmission of a packet including new credits will be repeated until transmission of all the HIPPI bursts from the transmission side device is completed.

After the above-described control is repeated until all the HIPPI bursts are sent from the transmission side device to the reception side device, a cut-off instruction packet 15 for instructing to cut off data transmission is transmitted from the transmission side device to the reception side device.

In a conventional ATM communication device, a communication line on the ATM side is composed of high-speed ATM lines, one for transmission and the other for reception, as described in the foregoing. In other words, the conventional device is structured such that both physically and logically, independent transmission and reception HIPPI interfaces correspond one-to-one to a transmission line and a reception line on the ATM side. Conventional techniques of this kind are disclosed, for example, in Japanese Patent Laying-Open (Kokai) No. Heisei 4-220835, entitled "Flow Control System in Wide-band ISDN" and Japanese Patent Laying-Open (Kokai) No. Heisei 5-22334, entitled "ATM Cellulation Mode of HIPPI".

Recited in Japanese Patent Laying-Open No. 4-220835 is a flow control system structured, so as to improve efficiency of data transfer of HIPPI without an effect of a delay in an ATM network, such that terminal adapters for an HIPPI on the transmission and reception sides are provided with buffers for accumulating a predetermined number of cells and such that before receiving a ready signal from the reception side, the transmission side terminal adapter sends ready information corresponding to the number of bursts which can be stored in the buffer to the transmission side terminal to hold transmittable bursts irrespective of a ready signal from the reception side.

Recited in Japanese Patent Laying-Open No. 5-22334 is an ATM cellulation mode of an HIPPI in which, at the time of transmitting, in an ATM cell, HIPPI data and parity of which 4-byte data and 0.5-byte parity constitute one word, cellulation is conducted on a basis of two words, with an odd-numbered word and an even-numbered word as a pair, in order to efficiently conduct ATM transmission in a format of a payload of a cell at the time of ATM-cellulation of HIPPI data and parity while saving unused worthless bits.

With the above-described corresponding relationship between an HIPPI interface and an ATM, used as a communication line is a common 155 Mbps capacity STM-1 line which sacrifices transfer efficiency or an expensive and rare 622 Mbps capacity STM-4 line. However, even the 622 Mbps capacity STM-4 line is too short in capacity for a communication rate of 800 Mbps at the HIPPI interface to conduct efficient ATM communication using interface signals of an HIPPI at a high speed. Although there is another line with a capacity of 2.4 Gbps as an ATM line, it is mainly used as a trunk line and not for direct connection between subscribers and an ATM network.

Conventional ATM communication devices have a shortcoming, as described in the foregoing, that use of a common 155 Mbps capacity STM-1 line causes the device to have a reduced communication rate and accordingly prevents the device from making the most of a high communication rate of an HIPPI.

On the other hand, with a 622 Mbps capacity STM-4 line, while preferable communication rate is obtained as compared with a STM-1, it is not high enough as compared with 800 Mbps of the HIPPI. Moreover, because of its high cost, use of the 622 Mbps capacity STM-4 line is not economical.

SUMMARY OF THE INVENTION

An object of the present invention is to provide an ATM communication device capable of conducting high-speed ATM communication using an HIPPI interface while making the most of a low-speed ATM line.

Another object of the present invention is to provide a highly economical ATM communication device using an inexpensive low-speed ATM line.

A further object of the present invention is to provide an ATM communication device which enables a combination of signal transmission paths at an arbitrary throughput and whose degree of network designing freedom is high.

According to the first aspect of the invention, an ATM communication device which realizes ATM communication using an interface signal of an HIPPI, comprises transmission means connected to an ATM network through an ATM line composed of a bundle of a plurality of lines for transmitting ATM cells independently for each system of the plurality of lines, signal converting means for converting an HIPPI burst into a protocol data unit with a header, signal splitting means for splitting the protocol data unit with a header converted by the signal converting means into split protocol data units with a header of a plurality of systems according to the number of the ATM lines, and cellulation means provided in the plural according to the number of the ATM lines for cellulating the split protocol data unit with a header split by the signal splitting means individually for each system and sending the cells over the ATM lines through the transmission means.

The signal splitting means may split the protocol data unit with a header along its bit direction.

The signal splitting means may split the protocol data unit with a header such that a proportional relationship is established between a communication rate of each of the ATM lines and a bit width of each split protocol data unit with a header corresponding to each line.

According to the second aspect of the invention, an ATM communication device which realizes ATM communication using an interface signal of an HIPPI, comprises reception means connected to an ATM network through an ATM line composed of a bundle of a plurality of lines for receiving ATM cells sent independently for each system of the plurality of lines, cell disassembling means provided in the plural according to the number of the ATM lines for disassembling ATM cells received at the reception means and for generating a split protocol data unit with a header for each system, signal reproducing means for reproducing a protocol data unit with a header by unifying the split protocol data units with a header of each system generated by the cell disassembling means, and signal converting means for converting the protocol data unit with a header reproduced by the signal reproducing means into an HIPPI burst.

The signal reproducing means may unify the split protocol data units with a header by aligning the same along a bit direction of pre-split protocol data units with a header.

According to the third aspect of the invention, an ATM communication device which realizes ATM communication using an interface signal of an HIPPI, comprises transmission means and reception means connected to an ATM network through an ATM line composed of a bundle of a plurality of lines for transmitting and receiving an ATM cell independently for each system of the plurality of lines, first signal converting means for converting an HIPPI burst into a protocol data unit with a header, signal splitting means for splitting the protocol data unit with a header generated by the first signal converting means into split protocol data units with a header of a plurality of systems according to the number of the ATM lines, cellulation means provided in the plural according to the number of the ATM lines for cellulating split protocol data units with a header split by the signal splitting means individually for each system and sending the cells to the ATM lines through the transmission means, cell disassembling means provided in the plural according to the number of the ATM lines for generating the same split protocol data units with a header of each system as split protocol data units with a header generated by the signal splitting means by disassembling ATM cells received at the reception means, signal reproducing means for reproducing a protocol data unit with a header by unifying the split protocol data units with a header of each system generated by the cell disassembling means, and second signal converting means for converting a protocol data unit with a header reproduced by the signal reproducing means into an HIPPI burst.

In the preferred construction, the signal splitting means may split the protocol data unit with a header along its bit direction, and the signal reproducing means may unify the split protocol data unit with a header by aligning the same along a bit direction of the pre-split protocol data unit with a header.

In the preferred construction, the signal splitting means may split the protocol data unit with a header such that a proportional relationship is established between a communication rate of each of the ATM lines and a bit width of each split protocol data unit with a header corresponding to each line.

According to another aspect of the invention, an ATM communication device which realizes ATM communication, comprises transmission means and reception means connected to a signal transmission path composed of a bundle of a plurality of lines for transmitting cells independently for each system of the plurality of lines, reception means connected to a signal transmission path composed of a bundle of a plurality of lines for receiving cells independently for each system of the plurality of lines, signal splitting means for splitting a signal received from a higher-order device into signals of a plurality of systems according to the number of lines of the signal transmission path, cellulation means provided in the plural according to the number of lines of the signal transmission path for cellulating each signal split by the signal splitting means individually for each system and sending the cells to the signal transmission path through the transmission means, cell disassembling means provided in the plural according to the number of lines of the signal transmission path for generating the same signal of each system as the signal split by the signal splitting means by disassembling a cell received at the reception means, and signal reproducing means for sending unified signals to a higher-order device by unifying signals of each system generated by the cell disassembling means.

In the above-mentioned construction, the signal splitting means splits a signal received from the higher-order device along its bit direction, and the signal reproducing means unifies the signals of each system by aligning the same along a bit direction of the pre-split signal.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to not unnecessarily obscure the present invention.

Figure 1:
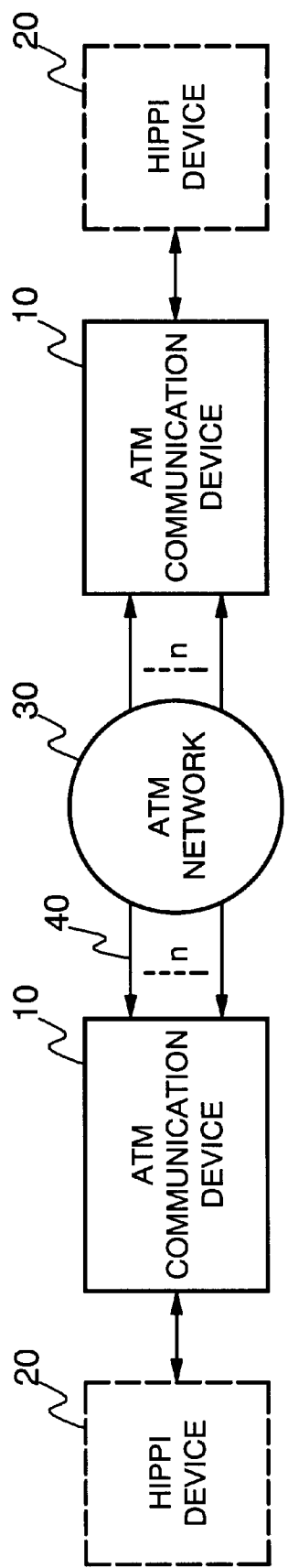
FIG. 1 is a block diagram showing system structure of a communication system employing an ATM communication device according to one embodiment of the present invention.

FIG. 1 is a block diagram showing a communication system using an ATM communication device according to one embodiment of the present invention.

The communication system illustrated in FIG. 1 includes an ATM communication device 10 connected to an ATM network 30 via a number n of ATM lines 40, and an HIPPI device 20 connected to the ATM communication device 10. Although two pairs of the ATM communication devices 10 and the HIPPI devices 20 are connected to the ATM network 30 in the example shown in FIG. 1, an arbitrary number of pairs can be connected. The number n of ATM lines 40 which connect the ATM network 30 and the individual ATM communication devices 10 differ from each other in communication rate. The ATM communication device 10 is allowed to arbitrarily select and use some of the number n of the ATM lines 40 for communication in consideration of a transfer efficiency. While the present embodiment will be described with respect to a case where the HIPPI device 20 is a super computer, the device 20 is not limited thereto and it may be a work station or other computer, a storage device using a disk medium or a semiconductor memory, or the like.

Figure 2:
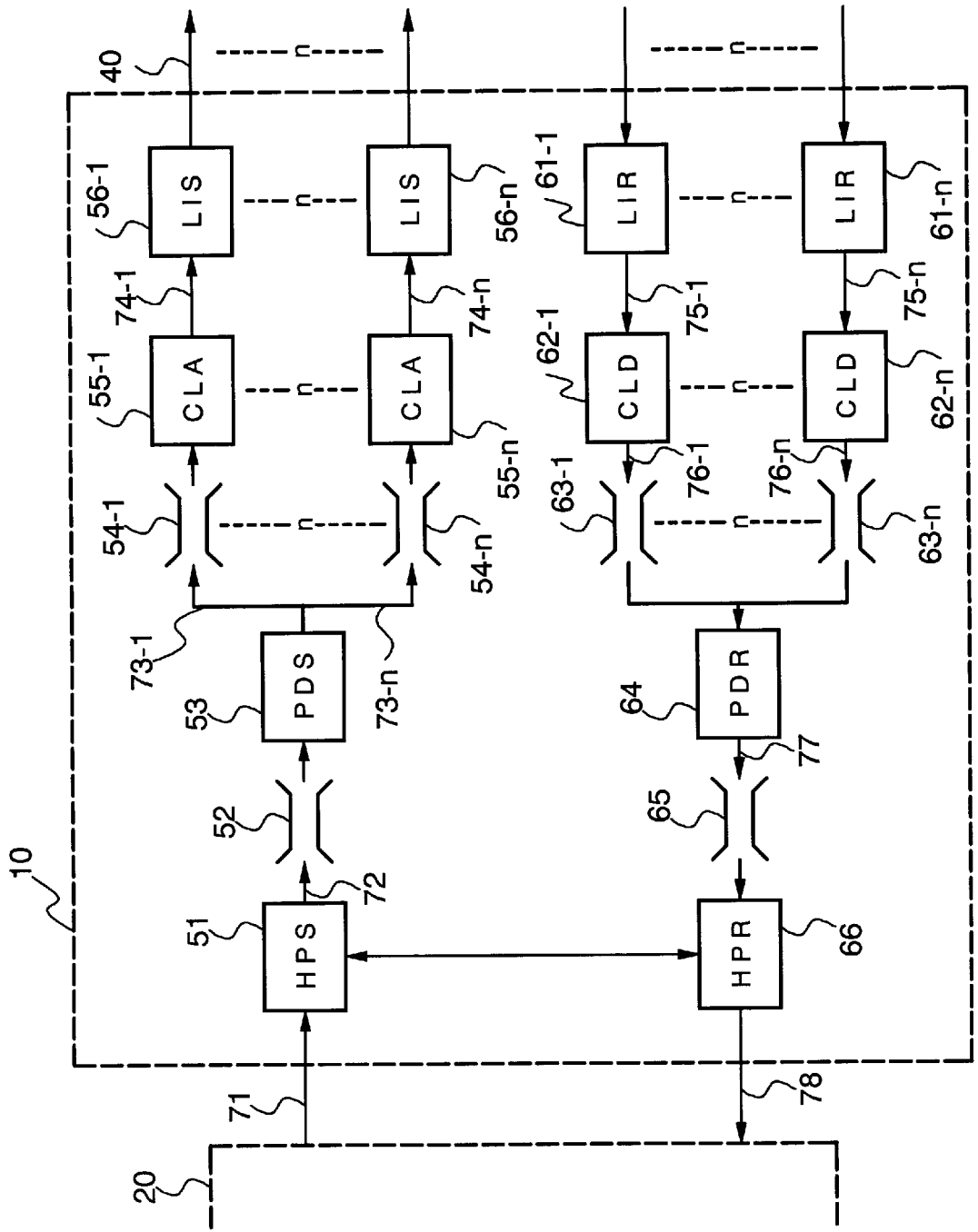
FIG. 2 is a block diagram showing structure of the ATM communication device of the present embodiment.

FIG. 2 is a block diagram showing structure of the ATM device 10 according to the present embodiment.

As illustrated in FIG. 2, the ATM communication device 10 of the present embodiment includes, for disassembling HIPPI bursts input through the HIPPI device 20 into cells and sending the cells over the ATM lines 40, an HIPPI burst transmission circuit (HPS) 51, a transmission H-PDU accumulating circuit 52, an H-PDU splitting circuit (PDS) 53, a transmission split H-PDU accumulating circuit 54, a cell assembling circuit (CLA) 55 and an ATM line termination transmission circuit (LIS) 56, and includes, for restoring HIPPI bursts from cells received through the ATM lines 40, an ATM line termination reception circuit (LIR) 61, a cell disassembling circuit (CLD) 62, a reception split H-PDU accumulating circuit 63, an H-PDU assembling circuit (PDR) 64, a reception H-PDU accumulating circuit 65 and an HIPPI burst reception circuit (HPR) 66. In the above-described structure, the transmission split H-PDU accumulating circuit 54, the cell assembling circuit (CLA) 55, the ATM line termination transmission circuit (LIS) 56, the ATM line termination reception circuit (LIR) 61, the cell disassembling circuit (CLD) 62 and the reception split H-PDU accumulating circuit 63 are prepared to the number of n corresponding to the number of the ATM lines 40. In the following description, these components are denoted with a subscript "1" or "n" as necessary, such as the transmission split H-PDU accumulating circuit 54-1 and the cell assembling circuit 55-n.

The HIPPI burst transmission circuit 51 deletes an LLRC (Length/Longitudinal Redundancy Checkword) part from an HIPPI burst 71 received from the HIPPI device 20 and adds an HB header to the burst to generate a protocol data unit (H-PDU) 72 with a header. Here, H-PDU represents a protocol data unit in "HIPPI over ATM". The generated H-PDU 72 is stored in the transmission H-PDU accumulating circuit 52.

LLRC is a check code of one word composed of horizontal parity bits which is applied for the error check of an HIPPI burst. LLRC is added to each HIPPI burst by a higher-order device. On the HIPPI burst reception side at the time of reception of an HIPPI burst, results of parity check in the direction of a time base obtained for each bit constituting data are collected and compared with LLRC to check existence/non-existence of an error. As described in the foregoing, LLRC is used only on an HIPPI interface and is deleted at the time of ATM cellulation.

HB header is a packet header constituting an H-PDU. Main functions of the HB header are as follows.

(a) indication of one field (switching information on the HIPPI interface)

(b) cut-off instruction (including the cut-off instructions both from the transmission side and the reception side)

(c) indication of burst length (d) notification of credit information (e) notification of packet information, error information and reset information The H-PDU splitting circuit (PDS) 53 reads the H-PDUs 72 stored in the transmission H-PDU accumulating circuit 52 one by one. Then, the PDS circuit 53 splits the H-PDU 72 in the bit direction to generate a number n of split H-PDUs 73-1 to 73-n. The generated n split H-PDUs 73-1 to 73-n are written one by one into the number n of transmission split H-PDU accumulating circuits 54-1 to 54-n. Each of the transmission split H-PDU accumulating circuits 54-1 to 54-n corresponds to each line of the number n of the ATM lines 40.

The cell assembling circuits 55-1 to 55-n correspond to the transmission split H-PDU accumulating circuits 54-1 to 54-n, respectively, and read the stored split H-PDUs 73-1 to 73-n independently and cellulate the same for each line. Generated cells 74-1 to 74-n are sent to the ATM line termination transmission circuits 56-1 to 56-n.

The ATM line termination transmission circuits 56-1 to 56-n send the received cells 74-1 to 74-n to their corresponding ATM lines 40.

On the other hand, the ATM line termination reception circuits 61-1 to 61-n send cells 75-1 to 75-n received through their corresponding ATM lines 40 to the cell disassembling circuits 62-1 to 62-n.

The cell disassembling circuits 62-1 to 62-n disassemble the received cells 75-1 to 75-n independently for each line to restore split H-PDUs 76-1 to 76-n. The restored split H-PDUs 76-1 to 76-1 are stored in their corresponding reception split H-PDU accumulating circuits 63-1 to 63-n.

The H-PDU assembling circuit 64 reads the split H-PDUs 76-1 to 76-n stored in the reception split H-PDU accumulating circuits 63-1 to 63-n and aligns them in the bit direction of the H-PDU. As a result, an original H-PDU 77 before being split by the ATM transmission device 10 on the transmission side is restored. The restored H-PDU 77 is stored in the reception H-PDU accumulating circuit 65.

The HIPPI burst reception circuit 66 reads the reception H-PDUs 77 stored in the reception H-PDU accumulating circuit 65 one by one to delete its HB header and adds an LLRC to restore an HIPPI burst 78. The restored HIPPI burst 78 is transmitted to the HIPPI device 20.

Here, the following relational expression holds between communication rates S1 to Sn on the respective ATM lines 40 and bit widths b1 to bn of the above-described H-PDUs.

$$S1:S2 \ldots :Sn = b1:b2: \ldots bn, \text{ where}$$
$$b1+b2+ \ldots +bn=32 \text{ (or 64)} \qquad (1)$$

In the above expression, "32" or "64" denotes an actual HIPPI bus width. In other words, a communication rate on each of the ATM lines 40 and each bit width of the H-PDUs are set to have a proportional relationship. This is for the purpose of transmitting the same amount of data in the same time period on an ATM line with a capacity, for example, of 622 Mbps and an ATM line with a half capacity, 311 Mbps, by setting a bit width of the former line to be double that of the latter line.

As described above, keeping a proportional relationship between a transmission rate of each of the ATM lines 40 and each bit width of the H-PDUs has an advantage of obtaining the maximum communication efficiency. Even when they fail to have a perfect proportional relationship, communication is possible. In this case, while a communication time is somewhat increased, more economical and higher-speed ATM communication device can be obtained as compared with a conventional device. Any combination establishing an arbitrary relationship other than the proportional relationship is therefore possible as long as it is in the allowable range of conditions including a communication rate.

Moreover, when a transmission rate of each of the ATM lines 40 is proportional to each bit width of the H-PDUs and a summation of the communication rates S1 to Sn of the ATM lines 40 has a following relationship, most efficient transfer is possible in a short time period.

$$S1+S2+ \ldots +Sn \geq 800 \text{ Mbps (or 1.6 Gbps)} \qquad (2)$$

In the above expression, 800 (Mbps) (or 1.6 Gbps) denotes an actual transfer rate of the HIPPI. If the above expression (2) is also satisfied, transfer at a maximum throughput can be realized with ease.

Figure 3:
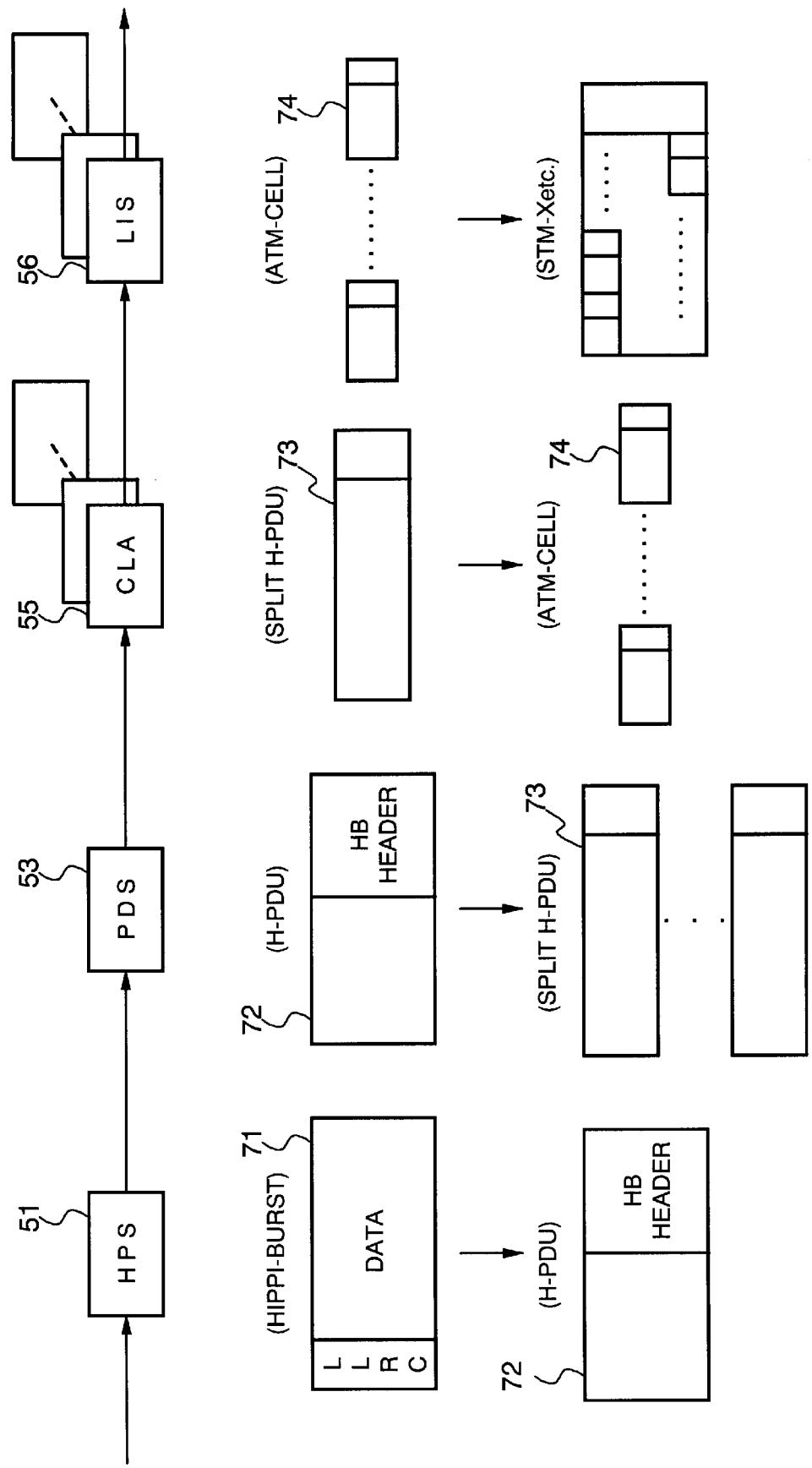
FIG. 3 is a diagram showing the state of data conversion in a case where an HIPPI burst is split into cells and transmitted.

FIG. 3 specifically shows the state of data conversion in a case where HIPPI bursts are split into cells and transmitted. In the figure, the contents of data conversion at each circuit are illustrated along the flow of data from the HIPPI burst transmission circuit 51 through the H-PDU splitting circuit 53 and the cell assembling circuit 55 to the ATM line termination transmission circuit 56. Although in the figure, processing of cellulating one split H-PDU at the processing of the cell assembling circuit 55 is shown, the number n of split H-PDUs are independently cellulated in parallel in practice.

In FIG. 3, first, the HIPPI burst transmission circuit 51 deletes an LLRC part (field) from the received HIPPI burst 71 and then adds an HB header to the burst to generate the H-PDU 72. Next, the H-PDU splitting circuit 53 splits the H-PDU 72 into a number n of split H-PDUs 73. Then, the number n of the cell assembling circuits 55 cellulate their corresponding split H-PDUs 73. Cellulation of each split H-PDU 73 is conducted independently by each cell assembling circuit 55. Lastly, the ATM line termination transmission circuit 56 transmits the generated cell 74 to the ATM communication device as a data transmission destination through the ATM line 40. In FIG. 3, STM-Xetc represents a generic name of existing transmission frames such as STM-1, STM 4 and SONET.

Figure 4:
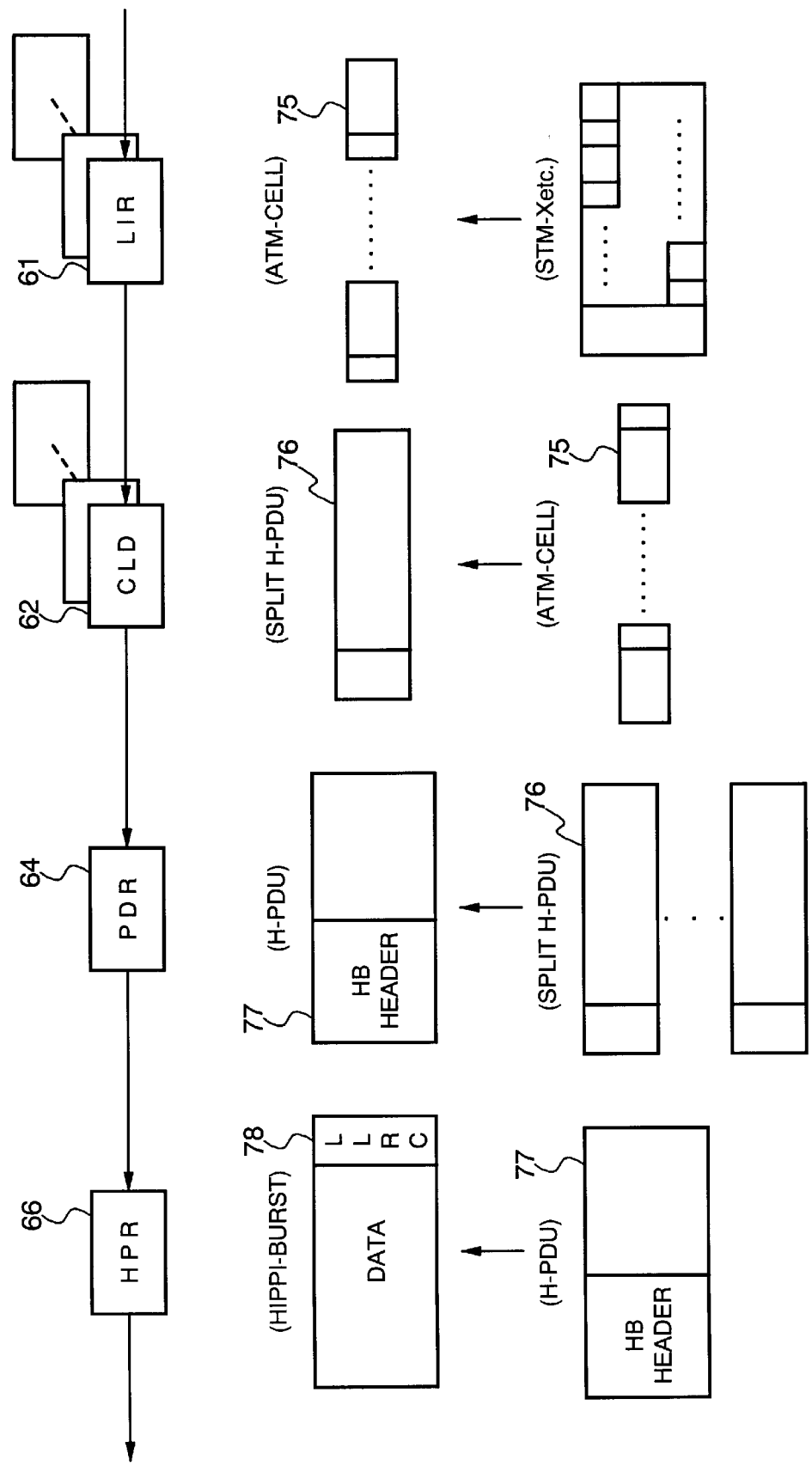
FIG. 4 is a diagram showing the state of data conversion in a case where received ATM cells are converted into an HIPPI burst.

FIG. 4 specifically shows the state of data conversion in a case where received ATM cells are converted into HIPPI bursts. In the figure, the contents of data conversion at each circuit are illustrated along a flow of data from the ATM line termination reception circuit 61 through the cell disassembling circuit 62 and the H-PDU assembling circuit 64 to the HIPPI burst reception circuit 66. Although in the figure, processing of restoring one split H-PDU from one pair of cells at the processing of the cell disassembling circuit 62 is shown, the number n of split H-PDUs are independently restored from the number n of cells in parallel in practice.

In FIG. 4, first, upon reception of the ATM cells 75 by the ATM line termination reception circuit 61, the cell disassembling circuit 62 assembles the split H-PDU 76 for each line from the cells 75. Next, the H-PDU assembling circuit 64 restores the original H-PDU 77 from all the split H-PDUs 76. Lastly, the HIPPI burst reception circuit 66 converts the H-PDU 77 into the HIPPI burst 78 and transmits the burst to the HIPPI device 20.

Figure 5:
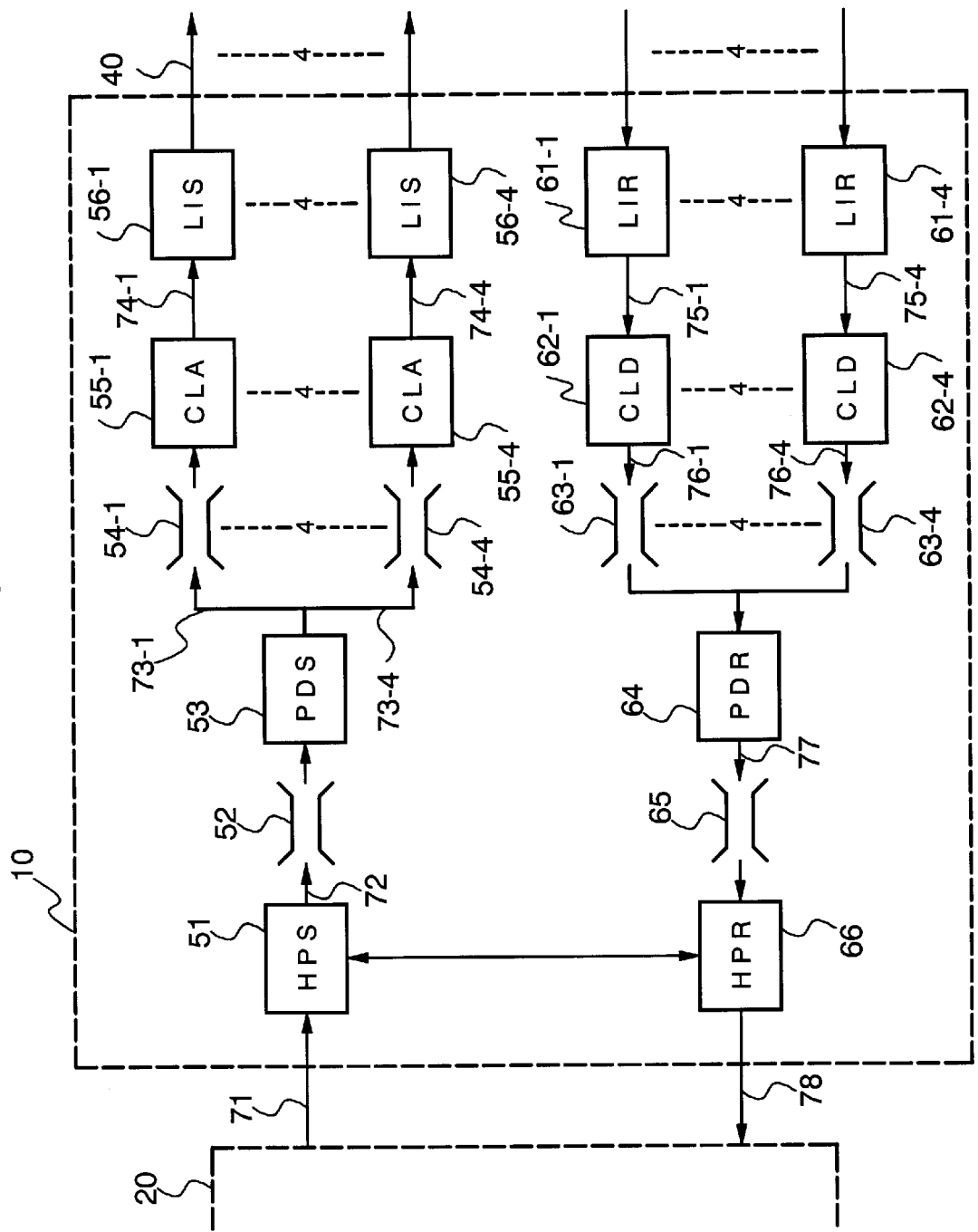
FIG. 5 is a block diagram showing structure of an ATM communication device 10 of the present embodiment, together with specific numeric values.
Figure 6:
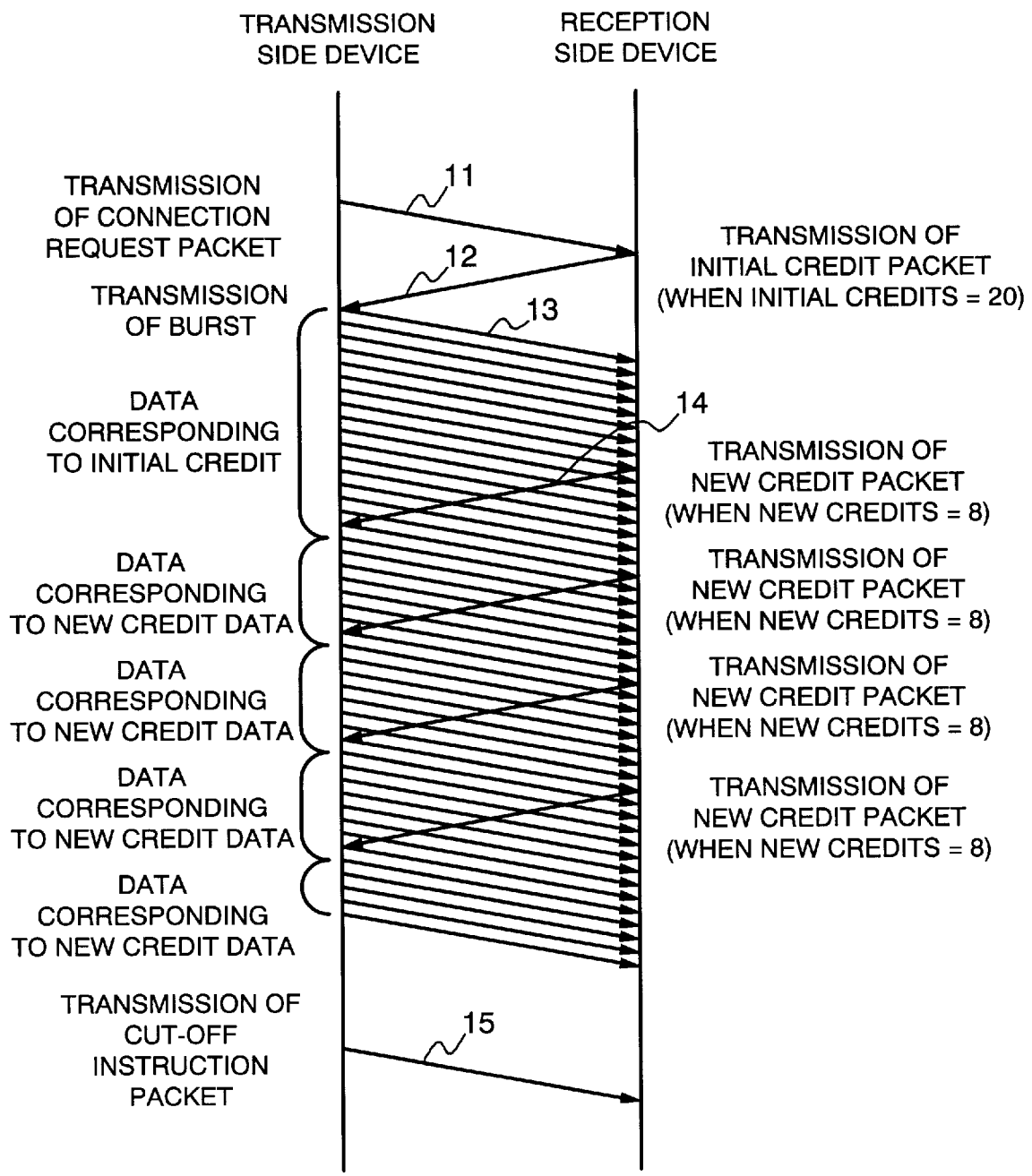
FIG. 6 is a timing chart showing the state of data transfer of a conventional ATM communication device using an HIPPI interface.

FIG. 5 is a block diagram showing the structure of the ATM communication device 10 according to the present embodiment, together with specific numeric values.

The ATM communication device 10 shown in FIG. 5 employs four ATM lines 40-1 to 40-4 which are connected to the ATM network 30 at a capacity of 155 Mbps each. An interface between the ATM communication device 10 and the HIPPI device 20 is for 800 Mbps capacity 32-bit parallel transmission.

In the ATM device 10, the HIPPI burst transmission circuit 51 deletes an LLRC part from an HIPPI burst 71 received from the HIPPI device 20 and adds an HB header to the burst to generate an H-PDU 72. Next, the generated H-PDU 72 is stored in the transmission H-PDU accumulating circuit 52. Then, the H-PDU splitting circuit 53 reads the H-PDUs 72 stored in the transmission H-PDU accumulating circuit 52 one by one and splits the H-PDU 72 in the bit direction into four, each having 8 bits, to generate four split H-PDUs 73-1 to 73-4. Next, the cell assembling circuits 55-1 to 55-4 cellulate the four split H-PDUs 73-1 to 73-4. The ATM line termination transmission circuits 56-1 to 56-4 then send cells 74-1 to 74-4 to the four ATM lines 40-1 to 40-4.

On the other hand, the ATM line termination reception circuits 61-1 to 61-4 send cells 75-1 to 75-4 received through their corresponding ATM lines 40-1 to 40-4 to the cell disassembling circuits 62-1 to 62-4. The cell disassembling circuits 62-1 to 62-4 then disassemble the received cells 75-1 to 75-4 to restore split H-PDUs 76-1 to 76-4 for each reception line. Next, the H-PDU assembling circuit 64 aligns the restored split H-PDUs 76-1 to 76-4 in the bit direction of the H-PDU to restore an H-PDU 77. The HIPPI burst reception circuit 66 then restores an HIPPI burst 78 from the restored H-PDU 77 and transmits the burst 78 to the HIPPI device 20.

As described in the foregoing, the present embodiment employs four 155 Mbps capacity ATM lines to enable data communication at 620 Mbps, a four times higher communication rate. Assuming here that the 155 Mbps capacity lines are STM-1 lines, they can obtain about the same communication rate as that of the 622 Mbps capacity STM-4 line. In general, introduction of the STM-4 line costs far more than four times that of the STM-1 line. The present embodiment employing four STM-1 lines is therefore more economical in the introduction of the lines. Moreover, with six or more, or 11 or more STM-1 lines, it is possible to set up a communication system fully allowing such HIPPI transfer rates as 800 Mbps and 1.6 Gbps.

Although in the foregoing, the description has been made of a case where the ATM communication device 20 is connected to the ATM network 30 via a number n of the ATM lines 40 and ATM communication is conducted using all the n lines, it is apparent that communication using an arbitrary number of lines can be conducted at a higher speed and more economically than by a conventional device.

As described in the foregoing, since the ATM communication device of the present invention employs a plurality of signal transmission paths (ATM lines) to transfer signals individually according to a transmission rate of each signal transmission path, high-speed communication using an HIPPI device is possible even if the transmission rate of the signal transmission path is low.

In addition, the present invention enables cost reduction by making the most of relatively inexpensive signal transmission paths.

A further advantage is that the degree of network designing freedom can be increased depending on a combination of signal transmission paths at an arbitrary throughput required. In other words, transfer at a maximum throughput of HIPPI such as 800 Mbps or 1.6 Gbps as necessary can be economically realized.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. An ATM communication device which realizes ATM communication using an interface signal of a high performance parallel interface (HIPPI), comprising:

a transmission unit connected to an ATM network through an ATM line composed of a bundle of a plurality of lines for transmitting ATM cells independently for each system of said plurality of lines;

a signal converting unit for converting an HIPPI burst into a protocol data unit with a header;

a signal splitting unit for splitting said protocol data unit with a header converted by said signal converting unit into split protocol data units with a header of a plurality of systems according to the number of said ATM lines; and a plurality of cellulation units provided according to the number of said ATM lines for cellulating said split protocol data unit with a header split by said signal splitting unit individually for each system and sending the cells over said ATM lines through said transmission unit.

2. The ATM communication device as set forth in claim 1, wherein said signal splitting unit splits said protocol data unit with a header along its bit direction.

3. The ATM communication device as set forth in claim 1, wherein said signal splitting unit splits said protocol data unit with a header such that a proportional relationship is established between a communication rate of each of said ATM lines and a bit width of each split protocol data unit with a header corresponding to each line.

4. An ATM communication device which realizes ATM communication using an interface signal of a high performance parallel interface (HIPPI), comprising:

a reception unit connected to an ATM network through an ATM line composed of a bundle of a plurality of lines for receiving ATM cells sent independently for each system of said plurality of lines;

a plurality of cell disassembling units provided according to the number of said ATM lines for disassembling ATM cells received at said reception unit and for generating a split protocol data unit with a header for each system;

a signal reproducing unit for reproducing a protocol data unit with a header by unifying said split protocol data units with a header of each system generated by said plurality of cell disassembling units; and a signal converting unit for converting said protocol data unit with a header reproduced by said signal reproducing unit into an HIPPI burst.

5. The ATM communication device as set forth in claim 4, wherein said signal reproducing unit unifies said split protocol data units with a header by aligning the same along a bit direction of pre-split protocol data units with a header.

6. An ATM communication device which realizes ATM communication using an interface signal of a high performance parallel interface (HIPPI), comprising:

transmission means and reception means connected to an ATM network through an ATM line composed of a bundle of a plurality of lines for transmitting and receiving an ATM cell independently for each system of said plurality of lines;

first signal converting means for converting an HIPPI burst into a protocol data unit with a header;

signal splitting means for splitting said protocol data unit with a header generated by said first signal converting means into split protocol data units with a header of a plurality of systems according to the number of said ATM lines;

cellulation means provided in the plural according to the number of said ATM lines for cellulating split protocol data units with a header split by said signal splitting means individually for each system and sending the cells to said ATM lines through said transmission means;

cell disassembling means provided in the plural according to the number of said ATM lines for generating the same split protocol data units with a header of each system as split protocol data units with a header generated by said signal splitting means by disassembling ATM cells received at said reception means;

signal reproducing means for reproducing a protocol data unit with a header by unifying said split protocol data units with a header of each system generated by said cell disassembling means; and second signal converting means for converting a protocol data unit with a header reproduced by said signal reproducing means into an HIPPI burst.

7. The ATM communication device as set forth in claim 6, wherein said signal splitting means splits said protocol data unit with a header along its bit direction, and said signal reproducing means unifies said split protocol data unit with a header by aligning the same along a bit direction of said pre-split protocol data unit with a header.

8. The ATM communication device as set forth in claim 6, wherein said signal splitting means splits said protocol data unit with a header such that a proportional relationship is established between a communication rate of each of said ATM lines and a bit width of each split protocol data unit with a header corresponding to each line.

9. An ATM communication device which realizes ATM communication, comprising:

transmission means and reception means connected to a signal transmission path composed of a bundle of a plurality of lines for transmitting cells independently for each system of said plurality of lines;

reception means connected to a signal transmission path composed of a bundle of a plurality of lines for receiving cells independently for each system of said plurality of lines;

signal splitting means for splitting a signal received from a higher-order device into signals of a plurality of systems according to the number of lines of said signal transmission path;

cellulation means provided in the plural according to the number of lines of said signal transmission path for cellulating each signal split by said signal splitting means individually for each system and sending the cells to said signal transmission path through said transmission means;

cell disassembling means provided in the plural according to the number of lines of said signal transmission path for generating the same signal of each system as the signal split by said signal splitting means by disassembling a cell received at said reception means; and signal reproducing means for sending unified signals to a higher-order device by unifying signals of each system generated by said cell disassembling means.

10. The ATM communication device as set forth in claim 9, wherein said signal splitting means splits a signal received from said higher-order device along its bit direction, and said signal reproducing means unifies said signals of each system by aligning the same along a bit direction of said pre-split signal.

11. The ATM communication device as set forth in claim 1, wherein said split protocol data units with a header respectively correspond to different portions of said protocol data unit with a header.

12. The ATM communication device as set forth in claim 11, wherein an entirety of said protocol data unit with a header is split up into said split protocol data units with a header.

13. The ATM communication device as set forth in claim 4, wherein said split protocol data units with a header respectively correspond to different portions of said protocol data unit with a header that is reproduced by said signal reproducing unit.

14. The ATM communication device as set forth in claim 13, wherein an entirety of said protocol data unit with a header is obtained by unifying said split protocol data units with a header.

15. The ATM communication device as set forth in claim 6, wherein said split protocol data units with a header respectively correspond to different portions of said protocol data unit with a header.

16. The ATM communication device as set forth in claim 15, wherein an entirety of said protocol data unit with a header is split up into said split protocol data units with a header.

17. The ATM communication device as set forth in claim 9, wherein said split protocol data units with a header respectively correspond to different portions of said protocol data unit with a header.

18. The ATM communication device as set forth in claim 17, wherein an entirety of said protocol data unit with a header is split up into said split protocol data units with a header.

* * * * *